United States Patent [19]

Nemit, Jr. et al.

[11] Patent Number: 4,465,446

[45] Date of Patent: Aug. 14, 1984

[54] RADIAL AND THRUST BEARING MOUNTINGS PROVIDING INDEPENDENT LOADING

[75] Inventors: Paul Nemit, Jr., Waynesboro, Pa.; Joseph W. Pillis, Hagerstown, Md.

[73] Assignee: Frick Company, Waynesboro, Pa.

[21] Appl. No.: 493,484

[22] Filed: May 11, 1983

[51] Int. Cl.³ .............................................. F01C 1/16
[52] U.S. Cl. .................................... 418/201; 308/174
[58] Field of Search ....................... 418/201, 202, 203; 308/174, 176, 189 A

[56] References Cited

U.S. PATENT DOCUMENTS

| | | | |
|---|---|---|---|
| 2,111,568 | 3/1938 | Lysholm | 418/201 |
| 3,388,854 | 6/1968 | Olofsson | 418/203 |
| 3,454,313 | 7/1969 | Lohneis | 308/236 |
| 3,719,440 | 3/1973 | Snider | 418/270 |
| 3,804,562 | 4/1974 | Hansson | 418/107 |
| 4,168,869 | 9/1979 | Stephan | 308/174 |

Primary Examiner—Leonard E. Smith
Assistant Examiner—Jane E. Obee
Attorney, Agent, or Firm—Dowell & Dowell

[57] ABSTRACT

A radial and thrust bearing mounting particularly adapted for a helical screw type compressor, is provided in which the radial load is isolated from the thrust load to prevent the thrust bearing from carrying any substantial radial load, and in which adjustment of the axial discharge end clearance between the faces of the rotors and the discharge end of the housing cover is provided.

4 Claims, 1 Drawing Figure

RADIAL AND THRUST BEARING MOUNTINGS PROVIDING INDEPENDENT LOADING

BACKGROUND OF THE INVENTION

The invention relates to anti-friction mountings for rotating shafts and more particularly to a mounting for carrying the axial and radial load of a compressor of the helical screw type. In a compressor of this type having a driven male rotor intermeshing with a female rotor the compression of the fluid between the rotors results in a high load in an axial direction. Thus in compressors of this type a thrust bearing has been used on each rotor shaft to maintain the rotors at a fixed noncontacting position between the end covers and to absorb the axial load. See for example, the patent to Lysholm U.S. Pat. No. 2,243,874.

A problem associated with the use of an axial thrust bearing independent of the radial load bearing, in the prior art, has been the absorption of some of the radial load by the thrust bearing. This subjects it to a type of load for which it is not designed and can lead to a malfunction or shortened life.

Furthermore, in a helical compressor of the type under consideration the clearance between the end faces of the rotors and the discharge end of the housing is critical as a determinate of the performance of the compressor.

Various kinds of bearing mountings for both radial and axial loads have been used heretofore in which an attempt has been made to compensate for the differences in the loadings.

Breckheimer U.S. Pat. No. 4,119,392 discloses a screw compressor with a short axially shiftable rotor carried by a roller bearing and an axially displaceable bearing which is directly engaged by a piston, the operation of which controls the position of the rotor.

The patent to Langner, U.S. Pat. No. 3,738,719, discloses a preloaded bearing in which a spring produces a preload value against the outer races of a coaxial bearing.

Hanson, U.S. Pat. No. 1,399,959 employs a compressible material instead of a spring with adjustment for preloading.

The German patent, No. 2,807,411 of 1978, discloses a bearing providing for preloading and rotor expansion.

Witte, U.S. Pat. No. 1,161,570 discloses a bearing mounting for use in line shaft hangers of different types.

Roggenburk, U.S. Pat. No. 2,762,340, employs a two-row ball set at each end for providing both radial and axial centering, in which each carries a portion of both loads.

Stoica, U.S. Pat. No. 3,429,228, employs a single-row ball bearing at each end to take the radial and thrust load, claiming thereby elimination of thrust bearings.

Schibbye, U.S. Pat. No. 3,467,300, discloses a helical screw type compressor with male and female rotors and which employs the thrust of the low pressure helical screws to counterbalance the thrust of the high pressure helical screws of a two stage compressor, and thus eliminate any heavy thrust load. Centering is obtained by thrust collars.

Ware, U.S. Pat. No. 3,528,757, employs an adjustable thrust collar to center the rotor.

Snider, U.S. Pat. No. 3,719,440, employs a Belleville type spring to provide preloading of two single-row radial bearings which handle both radial and thrust loads.

Hansson, U.S. Pat. No. 3,804,562, has a single-row radial bearing at one end of a shaft which is adjustable for centering of the rotor. At the opposite end of the shaft is another single-row ball bearing with the inner race positioned by a Belleville type spring, thus causing a preloaded thrust centering of the rotor, with both bearings carrying equal axial and thrust loading.

Beavers, U.S. Pat. No. 4,033,647, discloses thrust bearings which carry the vertical shaft loading. The bottom bearing carries a predetermined load and when the load is exceeded the top bearing carries the excess. Radial loading is insignificant and is carried by sleeves.

Lohneis, U.S. Pat. No. 3,454,313, discloses force preloading of a radial load carrying bearing and tapered thrust rings to compensate for shaft temperature changes and other axial loading. The single-row bearings must carry the axial load up to the limits of expansion of the thrust rings.

SUMMARY OF THE INVENTION

It is an object of the present invention to provide a mounting for the shafts of a helical screw type compressor which not only carries the radial load, but also carries the axial load so that the axial load bearing is subjected only to the axial load, not to any substantial radial load, and in which resilient means is included in the mounting so that the critical clearances at the discharge end between the end faces of the rotors and the discharge end cover may be externally observed and easily adjusted and maintained.

This is accomplished by mounting the thrust bearing so that its inner race is rigidly held on the shaft and its outer race is spaced from the assembly except on one inward face where it engages a carrier which bears against a Belleville spring, and in which the carrier is engaged by the end cover which is in fixed, predetermined, spatial relationship to the housing so that the axial position of the shafts, and hence, the clearances, are provided.

Further objects of the invention will become apparent from the following description in conjunction with the accompanying drawing.

DESCRIPTION OF THE PREFERRED EMBODIMENT

Figure 1:
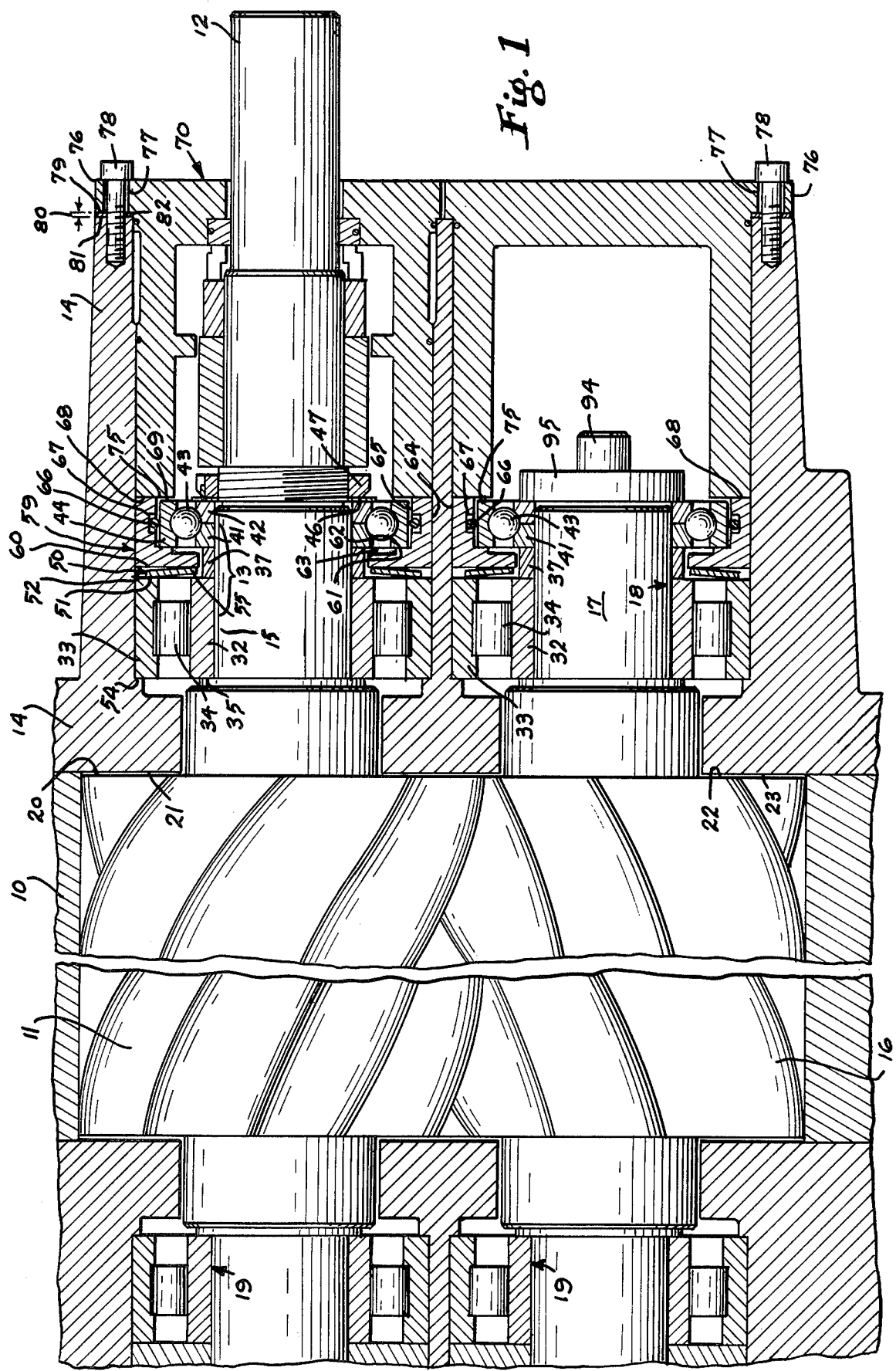
FIG. 1 is a section of a bearing assembly in accordance with the present invention illustrating its association with the rotors and the discharge end housing and cover.

With further reference to the drawing, there is illustrated an end portion 10 of the housing of a compressor of the helical screw type having a male rotor 11 carried by a drive shaft 12 which is supported at the discharge end by a bearing assembly 13 carried by a discharge end cover 14 that is fixed to the housing.

The male rotor 11 intermeshes with female rotor 16 having a shaft 17 which is supported by bearing assembly 18, similar to bearing assembly 13, and which is carried by the discharge end cover 14. At their remote ends, adjacent to the inlet, not shown, the shafts are carried by conventional bearing assemblies 19.

As is well known in the art, at the discharge end of any dual rotor screw compressor it is necessary to maintain a close running clearance between the male rotor discharge end 20 and the face 21 of the cover 14, and also between the female rotor end face 22 and the end face 23 of the cover 14. In the past a thrust bearing has been used to maintain the axial position of the rotors and to absorb the axial thrust load which results from the compression of the fluid between the rotors, but such thrust bearings have been subject to some radial load.

The present invention, as will be described, isolates the radial and thrust loads so that the thrust bearing substantially carries only a thrust load.

The bearing assembly 13 includes a roller bearing 15 for proper diametrical clearance and having inner and outer races 32 and 33, and roller 34. At its inward end, nearer to the rotors, the inner race 32 abuts a shoulder 35 on the shaft 12. At its outward end the inner race 32 abuts a spacer 37 which at its other end abuts a first section 41 of the inner race of a thrust bearing, said bearing having a second inner race section 42, balls 43, and an outer race 44.

The race section 42 is engaged by locking ring 46, held by nut 47 which is threaded onto shaft 12 and tightened against the locking ring, thrust bearing inner race sections 42 and 41, spacer 37, and inner race 32 against shoulder 35 of the shaft 12, thereby making these parts a rigidly fixed unit rotating with the shaft 12.

Radially outwardly of the spacer 37 of the aforementioned rigid unit a Belleville spring 50 is positioned so that an outer portion 51 engages an outward face 52 of the outer race 33 of the roller bearing assembly. The inward face 53 of the outer race 33 engages the inner shoulder 54 of the end cover 14. The inner portion 55 of the Belleville spring engages a bearing carrier 59 at its inward face 60.

The bearing carrier 59 has a substantially L-shaped cross section and has an inside face 61 which engages the inward face 62 of the outer race of the thrust bearing. The leg of the bearing carrier extending radially inwardly has a recess 63 for the purpose of avoiding contact with the inner race of the thrust bearing. The bearing carrier has an outer periphery 64 which engages the cover 14 and an inner periphery 65 which is spaced from the outer periphery of the outer race 44 of the thrust bearing sufficient to avoid contact because of permissible radial movement in bearing assembly 15.

In the clearance space provided an O-ring 66 is carried in a groove 67 in the inner wall of the bearing carrier. The O-ring is a relatively close fit for nonspinning purposes but is sufficiently compressive so as to avoid exerting pressure on the outer race of the thrust bearing. The outward face 68 of the axially extending leg of the bearing carrier is axially spaced from the face 61 in order to extend outwardly of the outer face 69 of the outer race 44 of the thrust bearing.

With the assembly thus far described it will be apparent that with a predetermined axial length of the spacer 37 and of the distance between the faces 61 and 68 of the bearing carrier 59, tightening of the nut 47 will result in compressing the Belleville spring causing the shaft and the fixed unit rotating with it to move into a position in which the face 20 of the end of the rotor 11 engages the face 21 of the housing cover.

In order to fix the assembly in place and with a space between the faces 20 and 21 a shaft seal enclosure or end cover 70 is mounted internally of the discharge end housing cover 14 and pulled into contact at its inward face 75 with the face 68 of the bearing carrier 59. It will be noted that the inward face 75 is spaced from the outer face 69 of the outer race of the thrust bearing due to the aforementioned length of the axially extending leg of the spacer 37. The end cover 70 has an outer rim portion 76 with openings 77 through which bolts 78 extend for engagement with the cover 14. The radially inner portion of the end cover is of a suitable configuration to receive the shaft 12 and has appropriate sealing means well known in the art.

The end cover 70 on the inward face 79 of its rim is constructed and dimensioned so that when the cover is initially pulled into contact by the bolt 78 with its inward face 75 engaging the face 68 of the bearing carrier 59 there will be a small gap 80 between the rim 76 and the face 81 of the cover 14. By reducing this gap 0.005" to 0.007" (0.127–0.178 mm) the inward axial movement against the Belleville spring further compresses it and produces similar inward movement of the rotor and shaft assembly to provide a similar clearance between the faces 20 and 21. The desired axial length of gap is fixed by inserting a shim 82 in such space of a thickness corresponding to the reduced length of the gap.

Shaft 17 of the female rotor 16 has the same type of radial and thrust bearing assembly as shaft 12 of the male rotor. Shaft 17 has a locking bolt 94 and plate 95 which take the place of and serve the same purpose as the nut 47 on shaft 12. The inward face 75 of the end cover 70 engages the corresponding bearing carrier for the shaft 17, as described above.

The Belleville springs 50 have a load rating such that the highest running compressor discharge pressure will not cause a further compression thereof, thus retaining the clearances between the faces 20 and 21, and 22 and 23, as provided at the time of assembly.

As a result of the bearing structure and arrangement described the thrust bearings are subjected substantially only to axial load and the clearance at the discharge end of the compressor may be inspected and maintained.

We claim:

1. In a bearing assembly including a radial bearing having inner and outer races, and a thrust bearing having inner and outer races, fixed in spaced relation on a shaft, and a housing around said bearing assembly, the improvement comprising, said housing carrying said radial bearing by means of mounting its outer race, carrier means overlying and radially spaced from the outer race of said thrust bearing, said carrier means extending into the space between the outer races of said radial and said thrust bearing and engaging an inward wall of the outer race of said thrust bearing, compressible means between the outward wall of said carrier means and the inward wall of the inner race of said radial bearing, and means coaxial with said shaft holding said carrier means, said compressible means, and said radial bearing outer race means in fixed relationship, whereby the carrying of radial load by said thrust bearing is substantially eliminated.

2. The invention of claim 1, in which said means coaxial with said shaft is fixed to said housing in spaced relation, thereby axially positioning said shaft with respect to said housing.

3. A helical screw type compressor having cooperating rotors within a housing and a discharge port at one end of the housing, said rotors having shaft means and discharge end walls, a bearing assembly carrying each shaft means, cover means having an inner wall and carrying the bearing assembly, said cover means having a face in facing relation to said discharge end walls of said rotors, said cover means and said housing being in fixed relationship, said bearing assembly comprising radial bearing means mounted on the shaft means and having outer race means in fixed relation with said cover means, thrust bearing means mounted on the shaft means and having inner and outer race means, means fixing the inner race means of said thrust bearing means, and the inner race means of said radial bearing means in spaced unmovable relationship on said shaft means, Belleville spring means around said shaft means and having a first portion engageable with the outward end of the outer race means of said radial bearing means, a bearing carrier of substantially L-shaped cross section engaging the inner wall of said cover means, said carrier having a first portion with an inward face engaging said Belleville spring means and a second portion around and spaced from said thrust bearing means, said bearing carrier first portion having an outward face engaging the outer race means of said thrust bearing means, said first portion being spaced from the inner race means of said thrust bearing means, end cover means having a rim portion extending over the outer end of the cover means and a body portion extending inwardly of said cover means and into engagement with the outward end of said bearing carrier, and means for securing the end cover means in spaced relation with the cover means and thereby exerting a force in a direction parallel to the axis of the shaft means against said bearing carrier whereby said shaft means are moved and the rotors' end walls are spaced a desired distance from said cover face and whereby the radial loads of the shafts are carried only by the radial bearing means and not transmitted to the thrust bearing means.

4. A helical screw type compressor having cooperating rotors within a housing and a discharge port at one end of the housing, said rotors having shaft means and discharge end walls, a bearing assembly carrying each shaft means, cover means having an inner wall and carrying the bearing assembly, said cover means having a face in facing relation to said discharge end walls of said rotors, said cover means and said housing being in fixed relationship, said bearing assembly comprising radial bearing means with inner race means mounted on the shaft means and outer race means engaging the cover means, said outer race means having an inward end in fixed relation with said cover means, spacer means around the shaft means and engageable with the outward end of said inner radial bearing means inner race means, thrust bearing means around the shaft means and having inner and outer race means, the inward end of the inner race means engageable with said spacer means, fastener means engageable with said shaft means and engageable with the outward end of the inner race means of said thrust bearing means, whereby said fastener means may hold the inner race means of said thrust bearing means, said spacer means, and the inner race means of said radial bearing means together in fixed unmovable relationship on said shaft means, Belleville spring means around said spacer means and having a first portion engageable with the outward end of the outer race means of said radial bearing means, a bearing carrier of substantially L-shaped cross section engaging the inner wall of said cover means, said carrier having a first portion around and spaced from said spacer means and a second portion around and spaced from said thrust bearing means, said bearing carrier first portion having an inward face engaging said Belleville spring means and an outward face engaging the outer race means of said thrust bearing means, said first portion being spaced from the inner race means of said thrust bearing means, whereby said fastener means in holding position may cause said shaft means to move so that said rotor end walls engage said cover face, end cover means, said end cover means having a rim portion extending over the outer end of the cover means and a body portion extending inwardly of said cover means and into engagement with the outward end of said bearing carrier, and means for securing the end cover means in spaced relation with the cover means and thereby exerting a force in a direction parallel to the axis of the shaft means against said bearing carrier whereby said shaft means are moved and the rotors' end walls are spaced a desired distance from said cover face and whereby the radial loads of the shafts are carried only by the radial bearing means and not transmitted to the thrust bearing means.

* * * * *